Patented May 11, 1937

2,079,735

UNITED STATES PATENT OFFICE 2,079,735

CONTROL MECHANISM FOR MILLING PLANERS OR OTHER MACHINES

John E. Doran, Cincinnati, Ohio, assignor to The G. A. Gray Company, Cincinnati, Ohio Application April 5, 1935, Serial No. 14,947

20 Claims. (Cl. 29—30)

The first object of my invention is to provide an arrangement which affords great flexibility of control of the several motors which drive the different elements of milling planers.

A second object of my invention is to provide a control with a minimum number of pilot switches and auxiliary control devices, thus greatly reducing the cost and complexity of wiring such control devices.

A third object of my invention is to provide a control so simple to operate that anyone who understands the operation of an ordinary planer, may, with but little instruction, become an efficient operator of a milling planer.

A fourth object of my invention is to provide a type of control that will, as far as possible, protect milling planers from damage due to improper operation of the control devices.

A fifth object of my invention is to provide convenient and handy controls for the various moving parts of a milling planer.

A sixth object of my invention is to provide controls whereby a milling planer can be changed in a few seconds from a reversing motor planer having intermittent feeds to the planing heads, to a milling machine having suitable continuous feeds to both the table and the milling heads, or changed conversely from a milling machine to a planer, with equal facility.

My objects further include the reduction of the cost of electrical equipment necessary to control milling planers.

The following description is for the application of my invention to milling planers. It will be understood, however, by those familiar with the art, that my invention is equally applicable in any case where a plurality of motors are used to operate a plurality of moving parts in any sort of mechanism which requires control of the type specified.

A milling planer is a machine tool similar to the usual double housing or openside planer, which is provided with one or more milling heads as well as one or more planing heads, together with suitable driving and feeding mechanism, so that work may be readily milled and planed in the same setting. This requires that the table of the machine be reciprocated at suitable cutting speeds by power when the machine is used for planing, and that the table or the milling heads be moved at suitable feeding speeds by power when the work is being milled.

For setting up the work for planing or milling, it is desirable to move the work table forward or backward by power at a speed suitable for rapid traverse. When positioning the work or milling cutters and for setting up for boring and drilling operations, which may also be done on milling planers, it is desirable to move the table or milling head very slowly into place by power so as to position the work or the head with great accuracy. All these features ordinarily require expensive control equipment, but they are accomplished in a simple and inexpensive manner by means of my invention.

In my invention, I make use of certain devices already well known in the art which in this disclosure I will designate as pilot members, or pilot switches, relays, interlocks, safety contact members, and selectors. In order to more clearly explain the invention, these devices are defined as follows:

A pilot member is any control device used in connection with a machine, (specifically an electric switch of any type) manually operated or operated by the movements of the machine or of a part thereof, and adapted to operate control devices which affect the operation of a source of mechanical power, (specifically the electrical control devices which affect the operation of an electric motor), the said source of power usually being used to operate the machine or one of its parts.

A relay is a control device used to affect the operation of one or more control devices, usually of larger capacity than the relay. Specifically, a relay is an electromagnetic switch used to affect the operation of one or more electromagnetic switches, usually of larger capacity than the relay. A relay may be used to affect itself in addition to other control devices.

A selector is a switch or combination of switches having two or more operative positions, and having a plurality of both movable and stationary contacts, the said movable contacts being so interconnected, and the said stationary contacts being so connected to control devices, that the sequence of operation, the devices controlled, or the effect of the control devices, change with a change in the operative position of the selector. A selector may be manually operated, or operated electromagnetically from remote control. For mechanical convenience, it may be divided into parts, the position of the principal part determining whether the other parts shall be energized or deenergized, and so determine their positions.

An electrical interlock is a pole of a multiple pole switch, which may be a relay or contactor, adapted to affect the operation of the switch to which it is attached, or the operation of one or more other switches.

A contactor is an electromagnetic switch designed to make and break electrical circuits carrying currents of sufficient magnitude to operate an electric motor. Relays and contactors usually, but not always, execute a movement at the instant that their actuating coil is energized or deenergized. In executing such a movement, the relay or contactor will open normally closed contacts, and close normally open contacts when energized, and close normally closed and open normally open contacts when deenergized. The relay or contactor may have both normally open and normally closed contacts. In order to avoid ambiguity, it will be said that a relay or contactor acts when its contacts assume the positions they would tend to have with the principal or actuating coil energized and that it reacts when the contacts assume the positions they would tend to have with the actuating coil deenergized.

A safety contact member is a pilot member which, when actuated by the movement of a manually operable or a power driven element of a mechanism, actuates control devices which prevent the initiation or continuance of a dangerous or undesirable movement of the mechanism.

Control devices consist of pilot members, relays, and contactors, together with suitable impedances, so interconnected as to function in controlling the starting, the stopping, and if desired, the speed and direction of rotation, of a motor or motors.

A preferred arrangement of my control is illustrated in the accompanying drawings, in which Fig. 1 is a pseudo-perspective view showing the principal parts of a milling planer.

Similar numerals refer to similar parts throughout the drawings.

Figure 1:
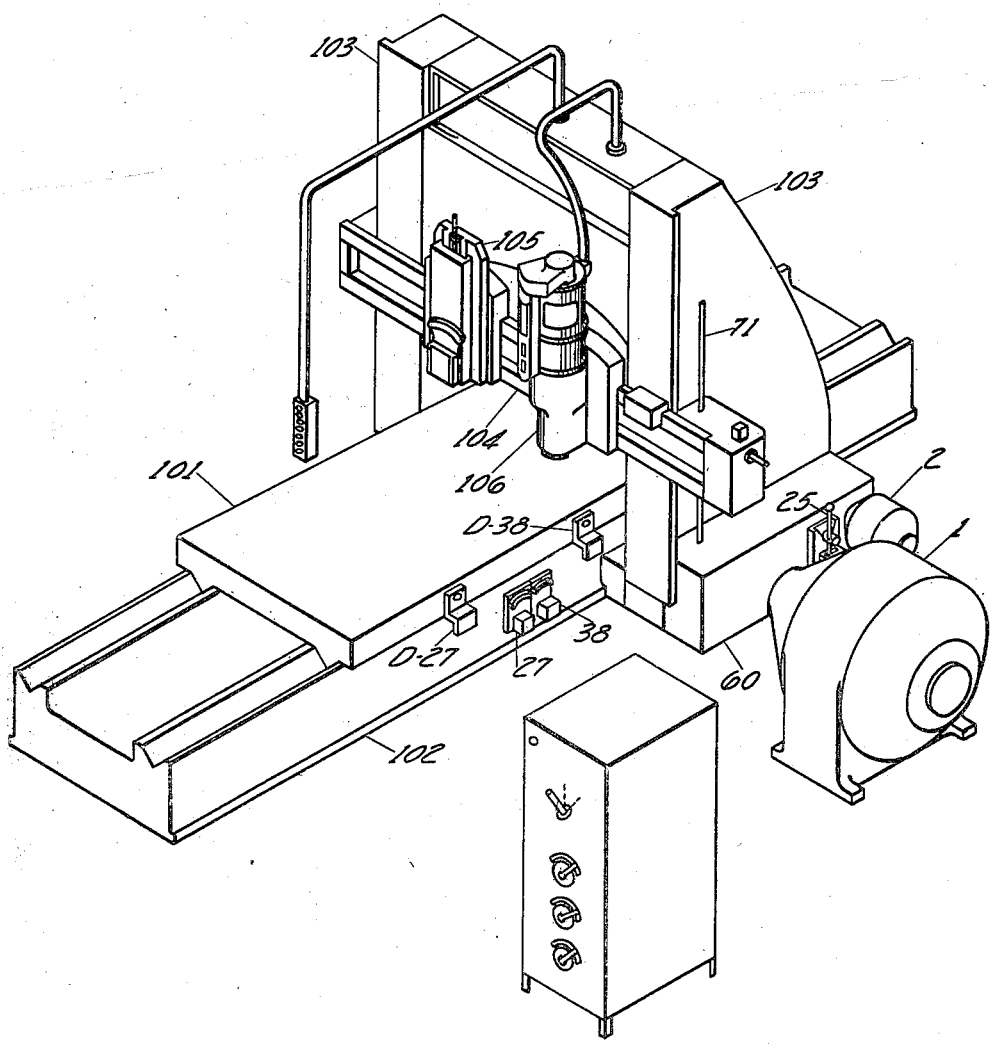

In the drawings and disclosure, relays and contactors are referred to by the same number as their principal or actuating coils, and their various pairs of contacts are referred to by attaching a letter to the number of the operating coil. Auxiliary coils are referred to by prefixing a letter to the number of the principal or actuating coil, which is also the number of the relay or contactor. Thus, coil 15 is the principal or actuating coil of contactor 15, which has several pairs of contacts such as 15—a, 15—b, and 15—c, and a lockout coil L—15.

Referring to Fig. 1, a table 101 is slidably mounted on a bed 102 to which are affixed housings 103 which support crossrail 104 carrying planer head 105 and milling head 106. A motor 1 is operatively connected to the planer shaft which actuates the table in a manner well known to those familiar with the art.

Figure 2:
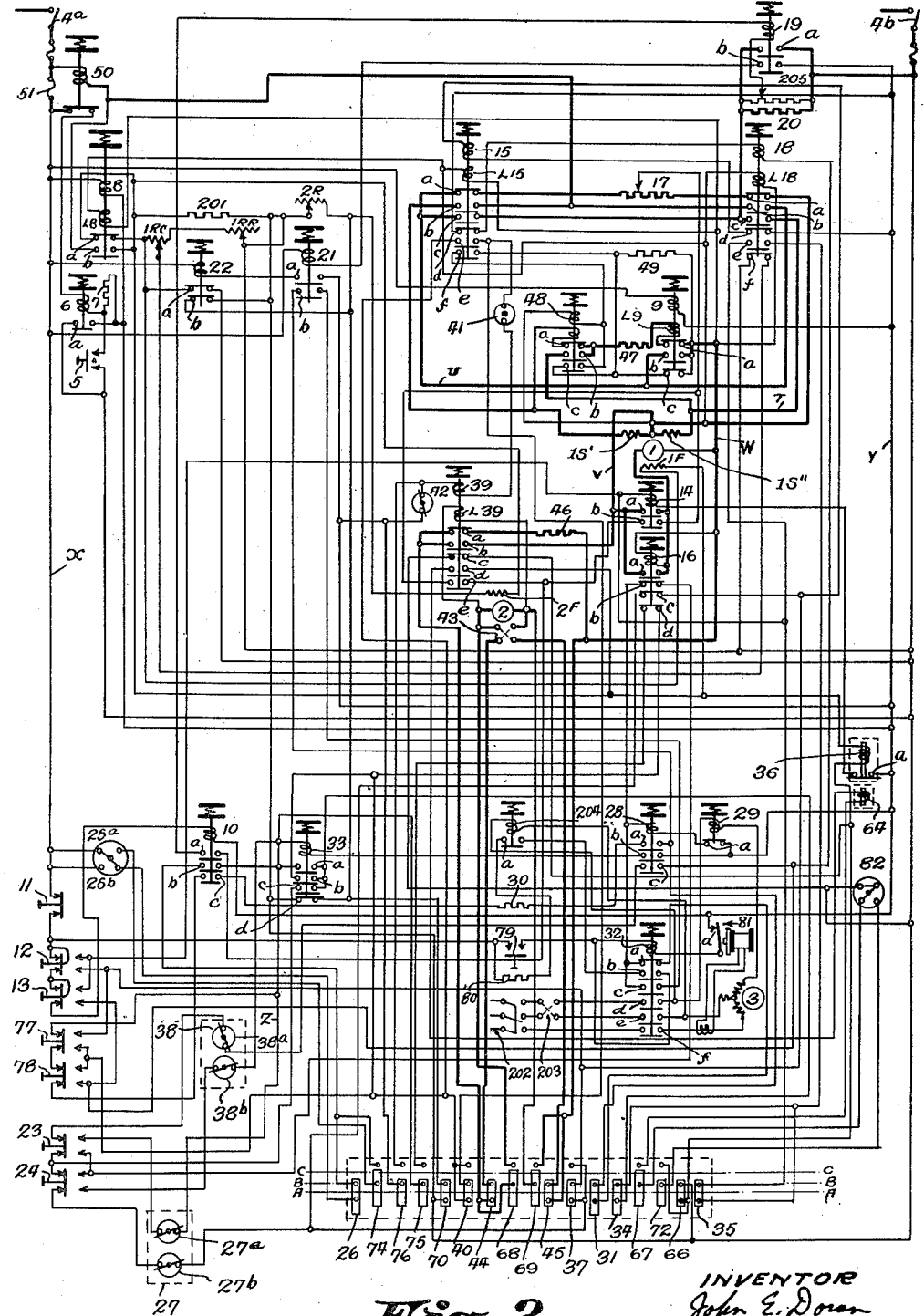
Fig. 2 is a wiring diagram of the electrical circuits.

In Fig. 2, the contacts are shown with the selector in position to operate the machine as a planer, and all circuits deenergized.

In Fig. 1 reference numeral 1 designates the motor which operates the planer table when the machine is used as a planer. This motor is started in the following manner:

After closing the fused knife switches 4—a and 4—b in the supply lines, reset push button 5 is momentarily pressed, energizing the reset coil 6, which closes the reset relay contacts 6—a. When button 5 is released, the circuit of coil 6 is maintained through resistor 7 and contacts 6—a. The closing of contacts 6—a connects the control bus Y to knife switch 4—b, thus energizing coil 8 which is part of a shunt field contactor. This, opens field discharge contacts 8—a, and closes contacts 8—b, thus energizing shunt fields 1—F and 2—F. Coil 9 is also energized, thus opening an emergency dynamic braking circuit at contacts 9—a and connecting the armature bus VW to the reversing bus TU by closing contacts 9—b. Coil 10 being now energized from the control bus Y through the normally closed contacts of push buttons 11, 12, and 13, the relay contacts 10—a, 10—b and 10—c will also close.

Table 101 may now be moved in the cut direction by pressing button 12, or it may be moved in the return direction by pressing button 13. These operations are called jogging because such operations continue only so long as the button is pressed. Assuming that button 12 is pressed to move the table in the cut direction, coil 14 and coil 15 are both energized, opening contacts 15—a, and closing contacts 14—a, 15—b and 15—c, thus energizing armature 1 with series field IS' in the circuit, causing the armature to rotate and to drive the table in the cut direction. Contactor coil 16 is energized at the same time as armature 1, closing contacts 16—a which remain closed as long as there is an appreciable counter-electromotive force generated by armature 1.

When button 12 is released, coils 14 and 15 are deenergized, causing contacts 14—a, 15—b and 15—c to open and contacts 15—a to close, deenergizing armature 1, and completing the circuit of armature 1 through dynamic braking resistor 17, thus bringing the armature quickly to rest. When the armature ceases rotating, the counter-electromotive force disappears, coil 16 is deenergized, and contacts 16—a open. It may be noted that contactor 16 is specially designed so that it will not open until the E. M. F. is extremely low. Such contactor are already well known in the art.

If button 13 is pressed instead of button 12, coils 14 and 18 are energized, opening contacts 18—a, and closing contacts 14—a, 18—b and 18—c, thus energizing the armature of motor 1, which drives the table in the return direction in exactly the same way as described above for the cut direction, except that series field IS'' is used in lieu of IS'. L—15 and L—18 are lockout coils on contactors 15 and 18 respectively, and they prevent opening of the dynamic braking circuits, once these circuits are established, until the dynamic braking cycle is completed. The use of coils for this purpose is common in the art, and needs no further explanation.

Jogging operations are of comparatively short duration and it is desired that they move the table slowly and always at the same speed regardless of the setting of the field rheostats 1—rc and 1—rr, which are the cut and return rheostats respectively for motor 1. The method by which this is accomplished is as follows. When either jog button 12 or 13 is pressed, coil 10 is deenergized, opening contacts 10—a which prevents coil 19 from being energized, which prevents accelerating contact 19—a from closing, and thus retains starting resistance 20 in the circuit of armature 1. Electrical interlock 19—b also remains open, preventing coil 21 from being energized and contacts 21—a from closing.

The normally open relay contacts 21—a prevent coil 22 from becoming energized, preventing contacts 22—a and 22—b from opening, and as a result the normally closed contacts 22—a shunt out all field resistance in the circuit of shunt field 1—f. The motor thus runs with maximum field strength and with reduced voltage on the armature, which is the slowest speed readily available on any given motor.

If it is desired to reciprocate the table automatically between the limits determined by dogs D—27 and D—38 (Fig. 1) which are adjustably mounted on the table, such operation may be started either in the cut direction or in the return direction by pressing button 23 or 24 respectively. If button 23 is pressed to start automatic operation in the cut direction, energy flows from positive control bus X, through automatic pilot member 25—a, through selector switch contacts 26, through relay contacts 10—b, auxiliary control bus Z, automatic pilot member 27—a, the now closed contacts of button 23, the normally closed contacts 16—b, relay coil 28, the normally closed relay contacts 29—a to negative control bus Y. Coil 28 closes relay contacts 28—a, establishing a holding circuit through the normally closed contacts of push button 77 and 78, relay contacts 10—c, resistor 30, relay contacts 28—a, selector switch contacts 31, electrical interlock 32—a, coil 28 and contacts 29—a, to to control bus Y. This circuit prevents coil 28 from being deenergized after button 23 is released.

Coil 33 is energized by the closing of 28—b, thus closing relay contacts 33—a, 33—b and 33—c. The closing of 33—a energizes coil 14 through auxiliary bus Z, selector switch contacts 34, 35, and electrical interlock 36—a, to negative control bus Y. Electrical interlock 36—a is always closed when the machine is used as a planer, as will be shown later. Contacts 14—a now close, and armature 1 is thereby connected to the armature bus VW. At the same time, relay contacts 33—c energize cut contactor coil 15, through relay contacts 33—a and 33—c, the closed contacts of button 24, pilot member contacts 27—b, selector switch contacts 37, coil 15, electrical interlock 18—d to negative control bus Y. Contacts 15—b and 15—c now close and start planer motor 1 on the cut stroke, and the operation of the motor continues even after button 23 is released. When the starting current decreases to a predetermined value, coil 19 closes contacts 19—a in the manner already well known in the art, which shunts the starting resistor 20, thus putting full line voltage on armature 1. Contacts 19—b also close, energizing relay coil 21 which closes contacts 21—a, which in turn energizes field contactor coil 22, opening contacts 22—a, thus inserting field rheostat 1—rc in the shunt field circuit. The setting of this rheostat determines the cutting speed. The operation of motor 1 continues until the table dog D—27 (Fig. 1) operates automatic pilot member 27, opening contacts 27—b, which deenergizes coil 15, opening contacts 15—b and 15—c and closing 15—a and electrical interlock contacts 15—d, thus causing stoppage of the motor by dynamic braking through dynamic braking resistor 17 as previously described.

The closing of the electrical interlock 15—d causes coil 18 to become energized by establishing a circuit from auxiliary control bus Z through relay contacts 33—a and 33—c, the closed contacts of push button 23, automatc pilot member contacts 38—a, relay contacts 28—c, coil 18, and electrical interlock 15—d to the negative control bus Y. However, the contactor 18 does not act until the pull of lockout coil L—18 decreases to such value that it is overcome by the pull of coil 18. When contactor 18 acts, contacts 18—b and 18—c close, causing the planer motor 1 to drive the table in the return direction. When the dog that operates automatic pilot member 27 strikes the pilot member again on the return stroke, it re-closes the contacts 27—b, so that 27—b is again in position to energize contactor 15 when automatic pilot member 38 is operated to open its contacts 38—a at the end of the return stroke, at which time it deenergizes contactor 18 which closes contacts 18—d, completing the circuit through coil 15 as before.

The planer feed is driven by motor 2 whenever the table is in operation controlled by the automatic pilot members 27 and 38. The actual amount of feed and the method of varying it is determined by mechanical means which is not a part of my invention, and therefore will not be described here. Suffice it to say that the feed occurs during the first part of one stroke and is reset during the first part of the other stroke as is general practice in planer design. The feed motor 2 is operated as follows.

The coil 39 of feed motor selector contactor 39 is energized from the auxiliary control bus Z through relay contacts 33—a and 33—b, selector switch contacts 40, pilot member 41, which serves as a feed limiting device, coil 39, and pilot member 42, to the negative control bus Y. Pilot member 42 prevents operation of the feed motor if the machine is operated as a planer, and if hand lever P—42 is in position to give continuous feed to the tool heads. Thus it may also be termed a safety contact member. Contactor 39 now acts, opening dynamic braking contacts 39—a and closing armature bus contacts 39—b. The armature of feed motor 2 is therefore connected to the armature bus VW and in parallel with armature 1 through reversing switch 43, selector switch contacts 44 and 45, and contacts 39—b. The feed motor thus starts, brakes, stops, and reverses automatically in synchronism with motor 1. It should be noted that the feed motor 2 remains stationary whenever motor 1 is jogged, thereby making it unnecessary for the operator to mechanically disengage the feed mechanism before jogging. This is an important advantage gained by my invention. The reversing switch 43 permits changing the direction of rotation of motor 2 with respect to motor 1, and thus permits selection of the stroke, either cut stroke or return stroke, on which the feed occurs. Clutches or similar mechanical devices are provided by the planer builder to mechanically engage and disengage the feed from the several feed screws and feed rods, but as they are not part of my invention they are not described here.

If the feed continues until the head strikes and opens automatic pilot member 41, contactor 39 opens, and motor 2 is brought quickly to rest by dynamic braking through the circuit closed by contacts 39—a containing dynamic braking resistor 46, selector switch contacts 44 and 45, reversing switch 43, and armature 2. Safety contact member 42 is operated by feed change lever P—42 (Fig. 1), which is the mechanical means for changing from continuous feed for milling, to intermittent feed for planing, and vice versa. It prevents the feed motor 2 from operating when the machine is used as a planer if the operator should absent-mindedly leave the feed change lever P—42 in the milling feed position.

To stop automatic operation of motors 1 and 2, the momentary pressing of button 11 deenergizes coil 10, thus momentarily opening relay contacts 10—a, 10—b, and 10—c, thereby returning relays 28 and 33, also contactors 15, 18, 14, 39 and 19 to the starting condition and both motors are brought quickly to rest by dynamic braking in the manner described above.

If, during the operation of the machine, the voltage supply should fail for any reason, the control bus is deenergized, causing all relays and contactors to return to the starting position, except contactor 16 which is energized for a time by the counter-electromotive force of armature 1. The closing of contacts 8—a short circuit shunt field 1—F, preventing a rapid decay of field excitation, thus assisting in providing flux for emergency braking. The closing of contacts 9—a completes an emergency dynamic braking circuit through lockout coil L—9, resistor 47, contacts 48—a or 48—b, series field IS' or IS'', contacts 16—a and the armature of 1. The series fields IS' and IS'' have opposing fluxes and it is necessary that the field which augments the decaying flux of shunt field 1—F be inserted in the emergency braking circuit. This is accomplished by contactor 48, the coil of which is energized from the armature bus VW only when the motor is driving the table on the cut stroke, thus completing the circuit through 48—b and IS'' on the cut stroke and 48—a and IS' on the return stroke. Lockout coil L—48 assures adequate contact pressure between contacts 48—a when emergency braking is called for on the return stroke. Contacts 15—f close the circuit of coil 48 through protecting resistor 49. Whenever the cut contactor 15 acts to energize the reversing bus TU, contacts 48—a open and contacts 48—b close. These contacts are ineffective except on emergency dynamic braking since they do not carry current when 9—a is open.

Contacts 48—c establish a holding circuit to keep coil 48 energized when contactor 15 is deenergized by failure of supply voltage. Contacts 9—c short circuit the protective resistor 49 to strengthen the action of coil 48 when emergency braking occurs. Contactor 48 is adjusted to drop out during reversal from cut to return stroke, and remains open throughout the return stroke. Thus, series field IS' is used when emergency dynamic braking occurs during the return stroke, and series field IS'' is used when emergency dynamic braking occurs during the cut stroke.

Resistance 201 provides a discharge circuit for both motor fields.

The operation of overload relay 50 opens contacts 50—a which in turn open the circuit through coil 6 of low-voltage relay 6 which deenergizes the entire control bus by opening contacts 6—a. Emergency dynamic braking is then placed in operation as described above for voltage failure. The control circuits are protected against damage from faults by the fuse 51.

Figure 3:
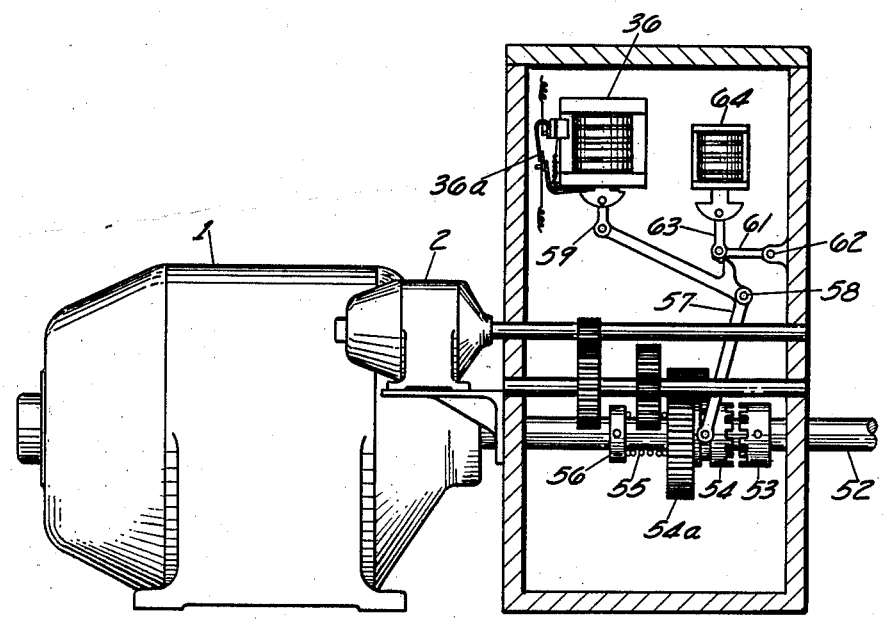
Fig. 3 is a diagram of the automatic clutch elements.

Feed motor 2 is connected through gearing and a clutch to the same table drive shaft of the machine to which motor 1 is coupled direct. To prevent damage to motor 2, and its gear train, it is necessary to provide interlocks to prevent operation of motor 1 when motor 2 is mechanically connected to the table drive. As a matter of convenience to the operator, I provide an automatic clutch control that requires no attention and precludes the possibility of accident. This control functions as follows:

Referring to Fig. 3, 1 is the planer motor, 2 is the feed motor and 52 is the drive shaft of the machine to be driven. A clutch element 53 is fast to drive shaft 52. A second clutch element 54, which is integral with a gear 54—a is slidably mounted on shaft 52, and is free to rotate on said shaft. A spring 55 is held in place by a collar 56 which is fixed to shaft 52, said spring being adapted to force clutch element 54 into engagement with clutch element 53. A clutch lever 57 is rotatably mounted on a fixed pin 58. A connecting link 59 links the lever 57 with a tractive electromagnet 36, in such a manner that the pull of the magnet forces clutch element 54 out of mesh with clutch element 53, and at the same time compresses spring 55. Latch 61 is rotatably mounted on a fixed pin 62, and so arranged as to permit clockwise rotation of lever 57 about pin 58, but to prevent counter-clockwise rotation of said lever.

A connecting link 63 links the latch 61 with a second tractive electromagnet 64 in such a manner that the pull of 64 disengages the latch 61 from the clutch lever 57 and allows the spring 55 to force the clutch element 54 into engagement with clutch element 53, if electromagnet 36 is deenergized.

Electromagnet 36 is provided with electrical interlock contacts 36—a, which make contact only when the clutch element 54 is completely disengaged from clutch element 53. The wiring and electrical connections of the tractive electromagnets are shown schematically in Fig. 2 in which 36 and 64 represent the solenoid coils, and 66 and 67 are selector contacts shown in the position for planing. As will be obvious from Fig. 2, electromagnet 36 is energized through contacts 8—b and selector contacts 66, and remains energized as long as the machine is used as a planer. It is also obvious that in the planing position of the selector the electromagnet 64 cannot be energized, as its circuit is opened by selector contacts 67. Thus, if the supply voltage should fail for any reason, the latch prevents the clutch element 54 from jumping into engagement with 53, and thereby causing damage, which might otherwise occur during the dynamic braking cycle of motor 1.

On practically all kinds of steel and on certain other alloys, it is necessary to plane at very slow speeds in order to secure a smooth finish of high-grade. This method of finishing has hitherto had very little practical application because of the expensive and unsatisfactory methods heretofore used in securing the required uniform low speeds on the ordinary commercial planer. My invention provides means whereby the feed motor may be adapted to drive the table during the cut strokes and the planer motor may be adapted to drive it during the return strokes.

To secure this result, the operator moves the selector switch from position A to position B, in Fig. 2, the latter being the position for slow planing. In this position, many of the selector contacts change from the closed to the open position while others change from the open to the closed position.

In order to make the direction of rotation of motor 2 independent of the position of reversing switch 43, and dependent only on the reversing contactors 15 and 18, selector contacts 44 and 45 open while 68 and 69 close, in changing the selector from the planing to the slow planing position. Selector contacts 70 are also open in position B, thus permitting control of the speed of motor 2 by rheostat 2—B, because automatic relay contacts 33—d are always open when the machine is being controlled by automatic pilot members 27 and 38. Field relay interlock contacts 22—b are opened when the accelerating contactor 19 acts.

The following additional changes in the selector contacts in Fig. 2 are made by placing the selector in position B for slow planing. Selector contacts 35, 37, 40 and 66, are now open instead of closed, and selector contacts 67 and 74 are now closed instead of open. All other contacts are as shown in Fig. 2. Slow planing may now be started on the cut stroke by pressing button 23. All contactors and relays function exactly as described for ordinary planing, except that contacts 18—e must close to energize contactor 14 and contacts 15—e must close to energize contactor 39. Contacts 14—b and 39—e prevent the accelerating contactor 19 from acting until one or the other motor is connected to the armature bus VW, thus insuring reduced voltage starting for motor 1 during slow-planning operations.

The energizing of contactor 39 opens contacts 39—c and closes contacts 39—d, this de-energizing electromagnet 36 and energizing electromagnet 64, tripping the latch 61, and allowing spring 55 to force the clutch 54—53 into engagement. Motor 2 then drives the table on the cut stroke. When table limit switch contacts (pilot switch contacts, 27—b open, both contactors 15 and 39 are thereby deenergized and motor 2 stops by dynamic braking. Electromagnet 36 is energized when contactor 39 is deenergized, disengaging clutch 54—53 which in turn closes contacts 36—a. Return contactor 18 became energized when contacts 15—d closed. Contactor 14 became energized when contacts 18—e and 36—a closed, causing motor 1 to operate and drive the table on the return stroke. Buttons 12 and 13 continue to serve as jog buttons, and operate to jog the table in both cut and return directions with motor 1 furnishing the driving power.

If it is desired to machine certain parts of the work by milling, the selector is put in the position marked C in Fig. 2. In position C of the selector, all those selector contacts which are closed in position A, are open, and those selector contacts which are open in position A, are closed in position C, with the exception of contacts 40 and 37, which are alike in both A and C, as shown in Fig. 2.

The jog buttons 12 and 13 continue to function, controlling planer motor 1 as in the case of ordinary planing and slow planing as described above. The gear shift lever 25, in Fig. 1, must be in position to give the correct gear ratios for milling feeds before it is possible to operate the feed motor 2. When lever 25 (Fig. 1) is manually thrown to the correct position, contacts 25—a open and contacts 25—b close, thus energizing the auxiliary control bus Z. Lever 25 is the mechanical means for changing the gear ratio between motor 2 and the mechanism driving cross rail feed transmission shaft 71 (Fig. 1) and also between motor 2 and the table drive gears.

In Fig. 1, 60 is the speed box which houses all the mechanical and electrical equipment shown schematically in Fig. 3. As will be seen in Fig. 2, contactor 39 is always energized when operating as a milling machine, except when motor 1 is operated to jog the table, at which time it is de-energized by contacts 10—b and 16—d. The function of 16—d is to delay the energizing of contactor 39 until the dynamic braking cycle of motor 1 is completed. Contactor 39 is again deenergized, stopping motor 2, when pilot member 41 functions to limit the cross feed of the rail head.

In order to jog the feed motor in the cut direction, button 77 is used. By pressing button 77, reversing contactor 15 is energized from auxiliary control bus Z, through selector switch contacts 75, electrical interlock 16—d, the now closed push button contacts of 77, coil 15 and interlock 18—d, to negative control bus Y. Thus, the feed motor 2 starts. Inasmuch as coil 28 is deenergized when the normally closed contacts of 77 are opened, contacts 28—b are opened and relay 33 is also deenergized and contacts 33—d close, thus providing full excitation for motor 2 during jogging.

The same operations take place when push button 78 is pressed, except that return contactor 18 acts instead of cut contactor 15, and the feed motor 2 thus runs in the return direction.

Electrical interlock 16—d prevents the reversing contactors 15 or 18 from acting when push button 77 or 78 is pressed unless the contactor 16 has reacted. A fast working operator might press button 12 or 13 to move the table a few inches in setting a milling cutter, then slide his finger to button 77 or 78 to jog a few thousandths of an inch further with motor 2. If contactor 15 or 18 were allowed to act before contactor 16 reacted, then contacts 16—a would remain closed and motor 1 would operate and cause damage. Interlock 16—d precludes the possibility of energizing either contactor 15 or 18 until the dynamic braking cycle is completed and 16 has reacted, thus preventing any possibility of damage.

Before starting the milling spindle, main line switch 202 must be closed and reversing switch 203 must be closed. It will be obvious to anyone versed in the art that a direct current motor may be substituted for the alternating current motor 3. The alternating current spindle motor is the preferred form.

The milling spindle is started by momentarily pressing button 79 which energizes coil 32 from bus X through stop button 11, push button 79, coil 32 and overload relay contacts 81—a to negative control bus Y. Contactor 32 acts, closing 32—d, 32—e, and 32—f, and motor 3 starts. When the button 79 is released, the coil remains energized through a holding circuit including resistor 80 contact interlock 32—b and contacts 204—a.

To start the table feed, the single pole double throw switch 82 is placed in position as shown in Fig. 2. To feed the table in the cut direction, button 23 is pressed. To feed the table in the return direction, button 24 is pressed. Assuming it is desired to feed in the cut direction, button 23 is pressed, thus energizing relay 28 in the same way as described for planing and slow planing. When the button is released, coil 28 remains energized, the circuit being from control bus Z through the normally closed contacts 77 and 78, stop relay contacts 10—c, resistor 30 the now closed relay contacts 28—a, the relay contacts 21—b which are closed when the accelerating contactor interlock 19—b causes relay 21 to act, the interlock 32—c which was closed when the spindle motor was started, coil 28, and instantaneous overload relay contacts 29—a, to negative control bus Y.

Contacts 28—b energize relay 33 which closes contacts 33—a, 33—b and 33—c. Cut directional contactor 15 is energized, the circuit being from auxiliary control bus Z through relay contacts 33—a and 33—c, closed contacts of push button 24, pilot member 27—b, selector contacts 37, coil 15, and electrical interlock 18—d, to negative control bus Y, thus closing directional contacts 15—b and 15—c and energizing the bus VW. Since contactor 39 is always energized when the selector is in the milling position, except when the stop relay 10 has reacted, or when contactor 16 has acted, the feed motor armature 2 is energized and operates to drive the table in the cut direction at a speed determined by the setting of the rheostat 2—r. The feed motor thus continues to run until the stop button 11 is pressed, or until the jog button 12 or 13 is pressed, or until jog buttons 77 or 78 are pressed, or until return direction button 24 is pressed, or until the table dog operates pilot member 27. An instantaneous overload on the spindle motor of sufficient value to cause overload relay 29 to act will also stop the feed by opening relay contacts 29—a, thus restoring relays 28 and 33, also contactor 15 to the deenergized condition. This is an important advantage gained by my invention as it prevents stalling of the spindle drive motor due to excessive feeds which might cause damage.

It should also be noted that my control prevents milling feed when the spindle drive motor is not running. This is accomplished by electrical interlock 32—c which is in the circuit of coil 28 when the selector is in the milling position. By this means it is not possible to inadvertently feed the work into a stalled cutter, which would cause great damage.

When the table dog strikes pilot member 27 and opens contacts 27—b, directional contactor 15 reacts, followed by the reacting of accelerating contactor 19. Interlock 19—b deenergizes relay 21 and opens contacts 21—b, thus deenergizing coil 28, which causes the automatic feed to discontinue. Thus, my control permits the table dogs and the pilot members to serve two purposes, namely, first to reverse the direction of table travel when planing, and second, acting as safety contact members, to arrest the table movement when milling, but eliminating duplication of control devices and thereby effecting a considerable saving.

It should also be noted that push buttons 23, 24, 77 and 78 control the movements of the table for both planing and milling operations and the directional sequence of the buttons is such that if the operator knows how to run the machine as a planer he will, with a few simple instructions, know how to run the machine as a milling machine also.

The deenergizing of spindle contactor 32 due to the operation of the time element overload thermoelectric relay 81 will cause relay 32 to react and interlock 32—c to open, and thus stop the feed as well as the spindle.

Failure of the A. C. supply voltage causes low voltage relay 204 to react which opens contacts 204—a causing relay 32 also to react. Contacts 32—c open and stop the feed as previously described.

If it is desired to cross feed the milling head along the rail while the table is stationary, the double pole switch 82 is thrown 180 degrees to the opposite position from that shown in Fig. 2. The table gearing is thus mechanically disconnected from motor 2. The feed gearing for the milling head is then connected to the feed motor by a manually operated clutch not shown, and not forming a part of this invention, and the feed motor 2 is started by pressing buttons 23 or 24, depending on the design of the rail feed mechanism.

It will be clearly seen that my control provides a maximum of safety against all contingencies that may possibly result in damage. It also provides a quick, accurate and convenient control for the operator, that enables him to change the machine from a planer to a milling machine, and vice versa, without appreciable loss of production time. It enables the operator to rapidly traverse his work table to any desired position under any conditions of operation by simply pressing the proper button. It permits the joint use of the more expensive control devices for controlling a number of motors in the desired manner regardless of whether the motors operate alternately or simultaneously, and regardless of the relations of the functions of the motors under the several modes of operation. It also permits a reduction in the number of control buttons required for satisfactory control of the machine in the several modes of operation.

It will be clear to those versed in the art, that various modifications of my control may be adapted to other kinds of machines than that described herein. It will also be evident that my method of control does not necessarily depend on direct manual operation of the selector or levers and other mechanical parts to change from planing to milling, or one type of operation to another. Push button control may be used whenever it is expedient or desirable, and the necessary mechanical parts be moved by tractive electromagnets or suitable electric motors.

Having described my invention I do not wish to confine it to the exact form shown, but to include all those forms which fall within the scope of the appended claims.

1. In a machine tool, a work support member, a first motor adapted to move the work support member at a relatively high speed, a second motor adapted to move the work support member at a relatively low speed, control devices for alternately starting and stopping the first and the second motors, pilot control members for actuating the control devices, and a clutch adapted automatically to disconnect the second motor when the first motor acts to drive the work support member and automatically to reconnect the second motor after the first motor has ceased to drive the work support member.

2. In a machine tool, a work support member, a first motor adapted to move the work support member at a relatively high speed, a second motor adapted to move the work support member at a relatively low speed, means for controlling said motors, and an electrically controlled clutch connected to said means and adapted automatically to disconnect said second motor when said first motor is energized to drive said work support member.

3. In a machine, a movable member, a first motor adapted to move the movable member at relatively high speed, a second motor adapted to move the movable member at relatively low speed, electrical control means connected to said motors and adapted to energize and deenergize the motors, and an electromagnetically operated clutch connected to said electrical control means and adapted to disengage the second motor before the first motor may be energized, and to reengage the second motor after the first motor is deenergized.

4. In a machine the combination of a plurality of movable elements, a first electric motor for driving one of said elements, a second electric motor for driving another of said elements, protective means connected to said first electric motor, control means connected to said second electric motor and means actuated by said protective means for operating the control means of said second electric motor when said protective means is operated.

5. In a milling planer, a work supporting table, and a tool support, means for causing relative movement between said table and said tool support, a first motor adapted to reciprocate the table by reversing its direction of rotation, a second motor adapted to feed the table for milling, control means comprising means for starting, stopping, and controlling the direction of rotation of said motors, and pilot members for actuating said control means, trip means actuated by said relative movement of said table and said tool support, said trip means including dog elements for actuating said pilot members, and selector means having a plurality of positions, said selector adapted when in one position to control said first motor to cause planing action of the table between the limits determined by said dogs and said pilot members, said selector adapted when in a second position to control said second motor to move said table for feeding between limits determined by said dog and said pilot members.

6. In a milling planer, a work supporting table, a first motor adapted to reciprocate the table by reversing its direction of rotation, a second motor adapted to feed the table for milling, control means for starting, stopping, and reversing the direction of rotation of said motors, said control means including pilot switches, dogs for actuating said pilot switches, manually operated switches, and a selector switch, said selector switch adapted when in one position to connect said pilot switches and said manually operated switches to control said first motor for reciprocating said table between the limits determined by said dogs on said pilot members, said selector switch adapted when in a second position to connect said pilot and said manually operated switches to control said second motor for moving said table for feeding between limits determined by the action of said dogs on said pilot members.

7. In a milling planer, a work supporting table, a first motor adapted to reciprocate said table, a second motor adapted to feed said table for milling, and control means for starting, stopping, and controlling the direction of rotation of the two motors, said control means including manually operated switches for initiating or stopping predetermined operations of the milling planer, pilot members cooperating with dogs for controlling the movement of said table, and a selector connected into said control means to obtain any one of a plurality of predetermined operating conditions by one or both of said motors.

8. In a machine tool having a tool support and a work support, said supports being relatively movable with respect to each other, prime movers for each of said relatively movable supports, controller means for each of the said prime movers, said controller means including pilot devices for actuating said controlling means, means for actuating said pilot devices comprising push button switches for controlling any or all of said prime movers, and means actuated in accordance with the relative movement of said supports for controlling the operation of certain of said prime movers.

9. In a machine tool having a first tool support for a single pointed tool, a second tool support for a multiple pointed rotating tool, and a work support relatively movable to either of said tool supports, a first prime mover for moving said work support for reciprocation, a second prime mover adapted to move either of said tool supports and said work support for feeding, controller mechanism for controlling the operation of said prime movers, pilot devices included in said controller mechanism for actuating the said controller mechanism, means for actuating the said pilot devices by the movement of the said supports, and a selector switch included in said controller mechanism for changing the effects of the actuation of the pilot members on the operation of the prime movers.

10. In a machine, a plurality of movable elements, a plurality of motors each adapted to drive one or more of the said movable elements, electrical control means adapted to control the several motors, including a plurality of manually operated pilot switches and a plurality of automatic pilot switches adapted to be actuated by one or more of the movable elements, electrical circuits interconnecting the parts of the said control means, the said electrical circuits being adapted to be energized by the operation of the said manually operated and automatically-operated pilot members, and a selector included in the said control means for rearranging selected circuits of the said control means whereby the said pilot switches may be employed to control either one or both of said motors selectively to drive one or more of the said movable elements.

11. In combination, a rotatable shaft, a first electric motor adapted to drive the shaft at a relatively high speed, a second electric motor adapted to drive the shaft at a relatively low speed, means for controlling the energization of the said motors, electrically actuated clutch means, and connections between the said electrically actuated clutch means and the said control means for automatically declutching the said second motor when the said first motor is energized to drive the said shaft.

12. In a milling planer, a work table, a first motor adapted to drive the table at relatively high speeds adapted for planing, a second motor adapted to drive the table at relatively low speeds suitable for milling feed, control means for controlling the energization of said motors, means associated with said table for actuating said control means, said control means including a selector for rearranging the circuit of said control means so that said table may be operated either as a planer or as a miller selectively by said first and second motors.

13. In a milling planer, a work table, a first motor adapted to drive the table at relatively high speeds adapted for planing, a second motor adapted to drive the table at relatively low speeds suitable for milling feed, electrical control means for controlling the energization and de-energization of said motors, pilot members included in said control means controlled by the displacement of said table for energizing and de-energizing certain circuits of said control means to control the operation of said motors, and a selector included in said control means rearranging the circuits of said control means for operating said table either as a planer or as a miller by said motors selectively.

14. In a system adapted to use two motors of unequal power for driving a machine tool, the combination of a first motor, a second motor, control means connected to said motors for causing said motors to run in either desired direction and for de-energizing said motors, said control means including pilot members for selectively energizing circuits of said control means, and a selector switch adapted to be placed into any one of three positions for rearranging the circuits of said control means according to the position of said selector switch, said selector adapted when in one position to arrange circuits of said control means to cause said first motor to run in one direction and then in the other, under the control of said pilot members, said selector adapted when in a second position to arrange circuits of said control means to cause the first motor to run in one direction and the second motor in the other direction under the control of the pilot members, said selector adapted when in a third position to arrange circuits of said control means to cause the second motor to run in either desired direction under the control of the pilot members.

15. In a machine, a plurality of movable elements, a plurality of motors each adapted to drive one or more of said movable elements at different speeds, electrical control means adapted to control the several motors, a plurality of pilot switches included in said means, said switches being adapted to be operated by the several movable elements to control the energization of selected circuits of said control means, and a selector included in said control means, said selector having means for rearranging selected circuits of said control means whereby said pilot switches may be employed to control either one or both of said motors selectively to drive one or more of said movable elements at different speeds to perform work at different rates or to perform different work.

16. In a machine, the combination of a plurality of movable working elements, a plurality of motors each adapted to drive one or more of said movable elements at different speeds, control means connected to control said motors, said control means comprising a plurality of push button switches, pilot switches, and a selector switch, said selector switch being connected into said control means in a manner such that one or more of said motors may be controlled by said push button switches and said pilot switches to operate one or more of said movable elements at different speeds to perform work at different rates or to perform different work.

17. In a machine tool, a plurality of motors each adapted to actuate certain elements of the machine tool in a predetermined manner, a plurality of control devices, connections between elements of the control devices and terminals of the motors, a selector having a plurality of terminals and movable contacts, circuits connecting elements of the control devices with terminals of said selector, a plurality of pilot members, connections between elements of said pilot members and selected terminals of said selector, said pilot members being positioned to be operated upon predetermined actuation of said machine tool, and means for moving said movable contacts of said selector into predetermined positions to arrange the circuits between the terminals of said selector into any one of a plurality of predetermined circuit arrangements whereby the control actions of said pilot members and said control devices on said motors may be changed to operate the machine tool to do any one of a predetermined number of operations depending upon the predetermined circuit arrangement selected by said selector.

18. In a machine tool, a plurality of motors each adapted to actuate certain elements of the machine total in a predetermined manner, a plurality of push button switches, connections between said switches and terminals of said motors, a selector having a plurality of terminals and movable contacts, circuits for connecting said switches with terminals of said selector, a plurality of pilot members, connections between elements of said pilot members and selected terminals of said selector, said pilot members being positioned to be operated upon predetermined actuation of said machine tool, and means for moving said movable contacts of said selector into predetermined positions to arrange the circuits between the terminals of said selector into any one of a plurality of predetermined circuit arrangements whereby the control actions of said pilot members and said switches on said motors may be changed to operate the machine tool to do predetermined work depending upon the predetermined circuit arrangement selected by said selector.

19. In a machine tool, a plurality of motors each adapted to actuate certain elements of the machine tool, a plurality of control devices, a selector, circuits between terminals of the motors and terminals of the selector, circuits between the elements of the control devices and terminals of the selector, a plurality of pilot members, circuits connecting elements of the pilot members with terminals of the control devices, and movable conductors forming a part of the selector adapted by movement of the selector to change the connections between its terminals, for the purpose of affecting the action of the control devices on the motors.

20. In a machine tool, a plurality of motors each adapted to actuate certain elements of the machine tool, a plurality of control devices, a plurality of pilot members, a selector, circuits between elements of the control devices and terminals of the motors, circuits between terminals of the selector and terminals of the motors, circuits between terminals of the control devices and terminals of the selector, circuits between terminals of the pilot members and terminals of the control devices, circuits between terminals of the pilot members and terminals of the selector, and movable conductors forming a part of the selector adapted by movement of the selector to change the connections between its terminals for the purpose of affecting the action of the control devices on the motors and of the pilot members on the control devices.

JOHN E. DORAN.